United States Patent
Salter et al.

(10) Patent No.: US 9,758,088 B1
(45) Date of Patent: Sep. 12, 2017

(54) AUXILIARY LIGHTING ROOF RACK

(71) Applicant: Ford Global Technologies, LLC, Dearborn, MI (US)

(72) Inventors: Stuart C. Salter, White Lake, MI (US); Aaron Bradley Johnson, Allen Park, MI (US); James J. Surman, Clinton Township, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/150,648

(22) Filed: May 10, 2016

(51) Int. Cl.
  *B60Q 1/00* (2006.01)
  *B60Q 1/26* (2006.01)
  *B60Q 11/00* (2006.01)
  *B60Q 1/24* (2006.01)
  *B60R 9/04* (2006.01)

(52) U.S. Cl.
  CPC .............. *B60Q 1/24* (2013.01); *B60Q 1/0041* (2013.01); *B60R 9/04* (2013.01)

(58) Field of Classification Search
  CPC .......... B60Q 1/0041; B60Q 1/24; B60R 9/04; B60R 9/08
  USPC .................. 362/464, 479, 485, 493, 540
  See application file for complete search history.

(56) References Cited

U.S. PATENT DOCUMENTS

| | | | |
|---|---|---|---|
| 2,086,524 A * | 7/1937 | Clark | B60Q 1/2611 362/493 |
| 4,779,168 A * | 10/1988 | Montgomery | B60Q 1/245 307/10.8 |
| 5,053,930 A | 10/1991 | Benavides | |
| 5,709,453 A | 1/1998 | Krent et al. | |
| 5,782,549 A * | 7/1998 | Glatzmeier | B60Q 1/2611 340/472 |
| 5,839,718 A | 11/1998 | Hase et al. | |
| 6,031,511 A | 2/2000 | DeLuca et al. | |
| 6,114,954 A | 9/2000 | Palett et al. | |
| 6,117,362 A | 9/2000 | Yen et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |

(Continued)

FOREIGN PATENT DOCUMENTS

| | | |
|---|---|---|
| CN | 2690228 U | 4/2005 |
| CN | 101337492 A | 1/2009 |

(Continued)

*Primary Examiner* — Jason Moon Han
(74) *Attorney, Agent, or Firm* — Jason Rogers; Price Heneveld LLP (57) ABSTRACT

A roof rack assembly is provided herein. A pair of support racks are provided on a roof structure of a vehicle. A first light source is coupled to each of the support racks and is disposed to downwardly project a light beam across a hood of the vehicle. A second light source is coupled to each of the support racks and is disposed to downwardly project a light beam to illuminate a corresponding ground area proximate a corner of the vehicle. A third light source is coupled to each of the support racks and is disposed to downwardly project a light beam to illuminate a corresponding ground area proximate a door of the vehicle.

17 Claims, 5 Drawing Sheets

(56) References Cited

U.S. PATENT DOCUMENTS

| | | |
|---|---|---|
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,377,674 B2 * | 5/2008 | Klinkman ............... B60Q 1/24 362/480 |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | La Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,414,168 B2 | 4/2013 | Jutila et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 8,985,414 B2 | 3/2015 | Aftanas |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0082326 A1 | 4/2005 | Badillo |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201169230 Y | 2/2009 |
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| FR | 2723042 A1 | 2/1996 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

\* cited by examiner

AUXILIARY LIGHTING ROOF RACK

FIELD OF THE INVENTION

The present invention generally relates to roof rack assemblies, and more particularly, to roof rack assemblies that are capable of producing illumination.

BACKGROUND OF THE INVENTION

Roof rack assemblies have long been used to secure objects to a vehicle. By virtue of their location on the vehicle, there is an opportunity to expand their utility by incorporating lighting features that are both functional and stylistic.

SUMMARY OF THE INVENTION

According to one aspect of the present invention, a roof rack assembly is provided. A pair of support racks are provided on a roof structure of a vehicle. A first light source is coupled to each of the support racks and is disposed to downwardly project a light beam across a hood of the vehicle. A second light source is coupled to each of the support racks and is disposed to downwardly project a light beam to illuminate a corresponding ground area proximate a corner of the vehicle.

According to another aspect of the present invention, a roof rack assembly is provided. A pair of support racks are provided on a roof structure of a vehicle. A first light source is coupled to each of the support racks and is disposed to downwardly project a light beam across a hood of the vehicle. A second light source is coupled to each of the support racks and is disposed to downwardly project a light beam to illuminate a corresponding ground area proximate a door of the vehicle.

According to yet another aspect of the present invention, a roof rack assembly is provided. A pair of support racks are provided on a roof structure of a vehicle. A first light source is coupled to each of the support racks and is disposed to downwardly project a light beam across a hood of the vehicle. A second light source is coupled to each of the support racks and is disposed to downwardly project a light beam to illuminate a corresponding ground area proximate a corner of the vehicle. A third light source is coupled to each of the support racks and is disposed to downwardly project a light beam to illuminate a corresponding ground area proximate a door of the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
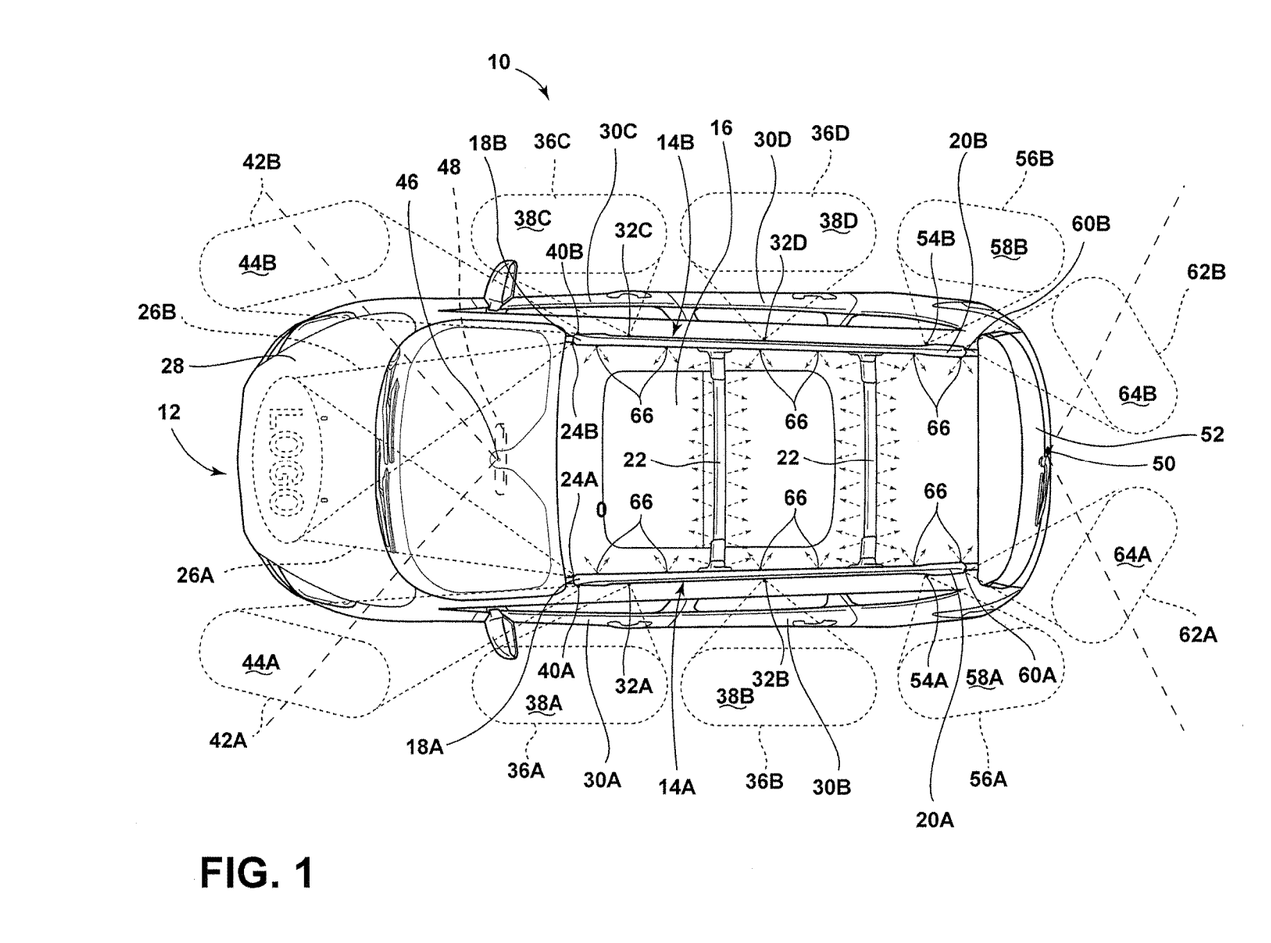
FIG. 1 is a top view of a vehicle equipped with a roof rack assembly having a variety lighting features.
Figure 2:
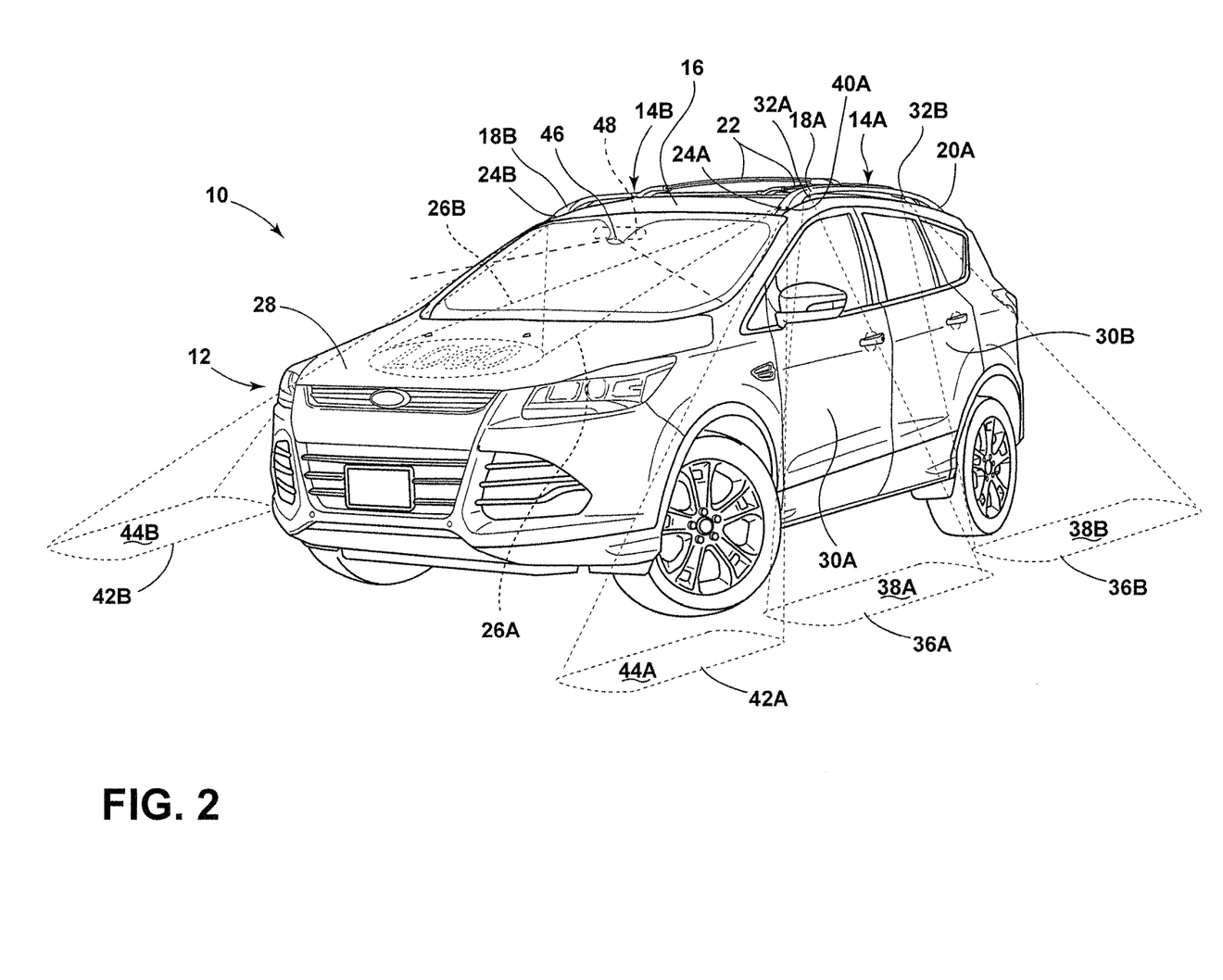
FIG. 2 is a front side perspective view of the vehicle shown in FIG. 1.
Figure 3:
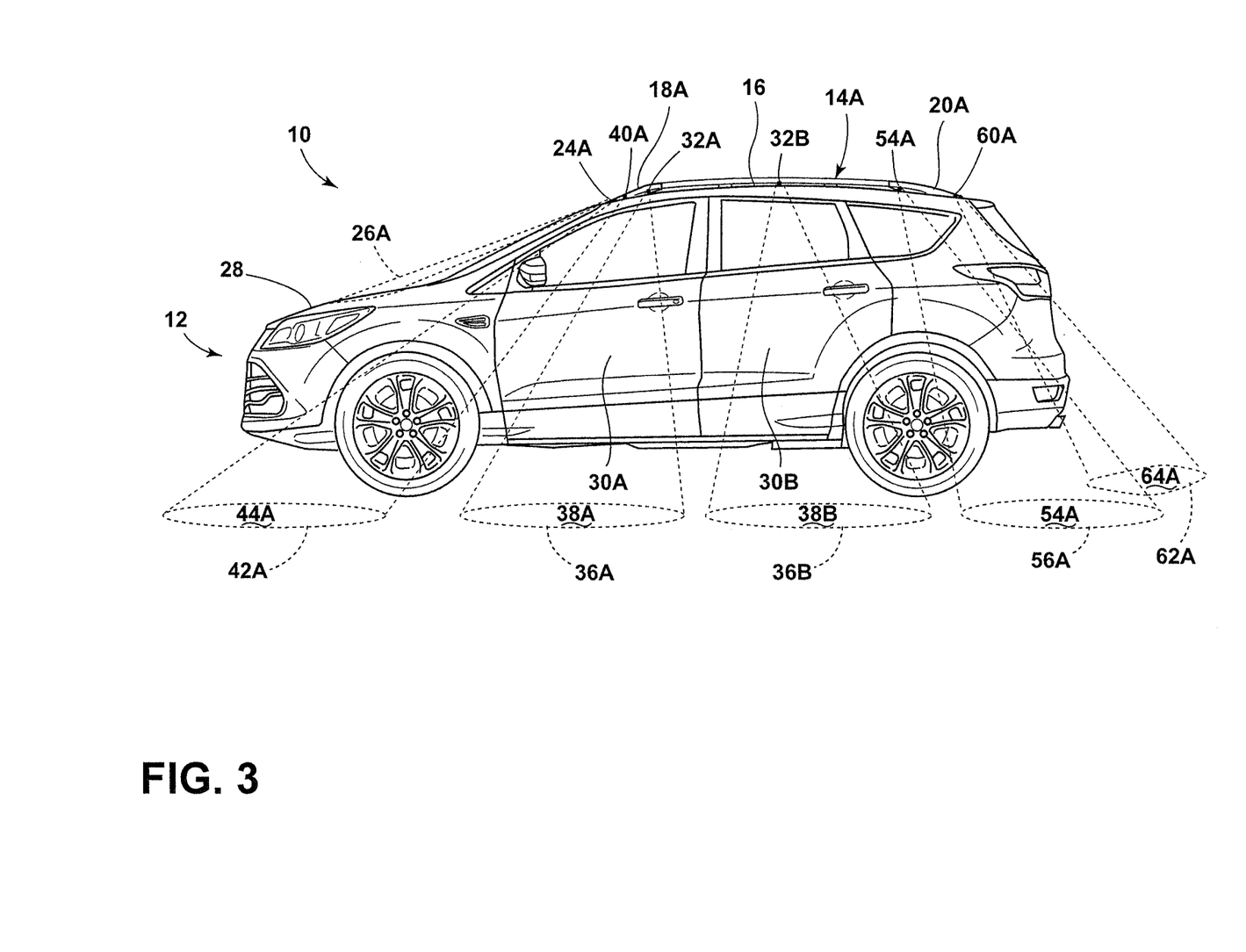
FIG. 3 is a side view of the vehicle shown in FIG. 1.
Figure 4:
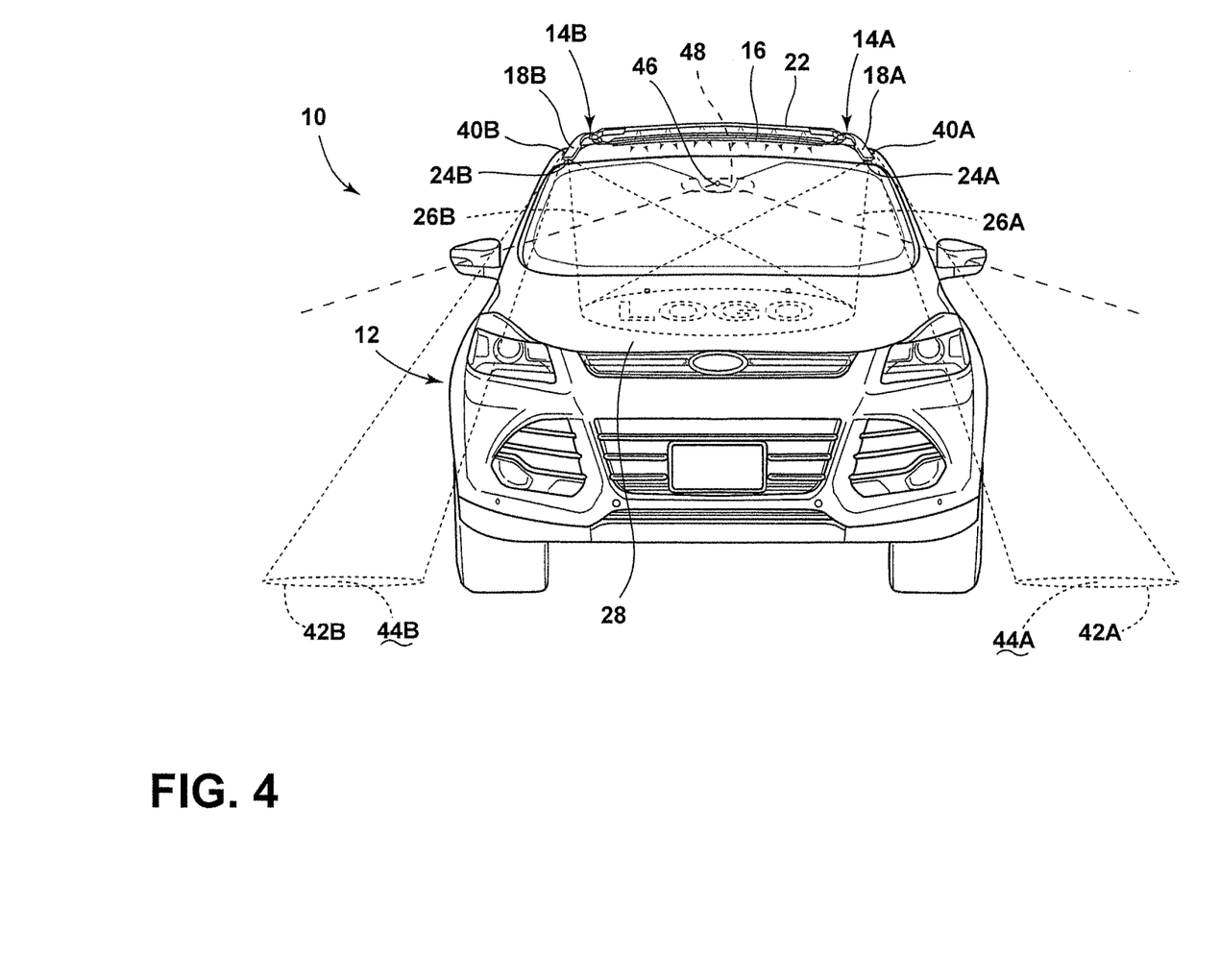
FIG. 4 is a front view of the vehicle shown in FIG. 1.
Figure 5:
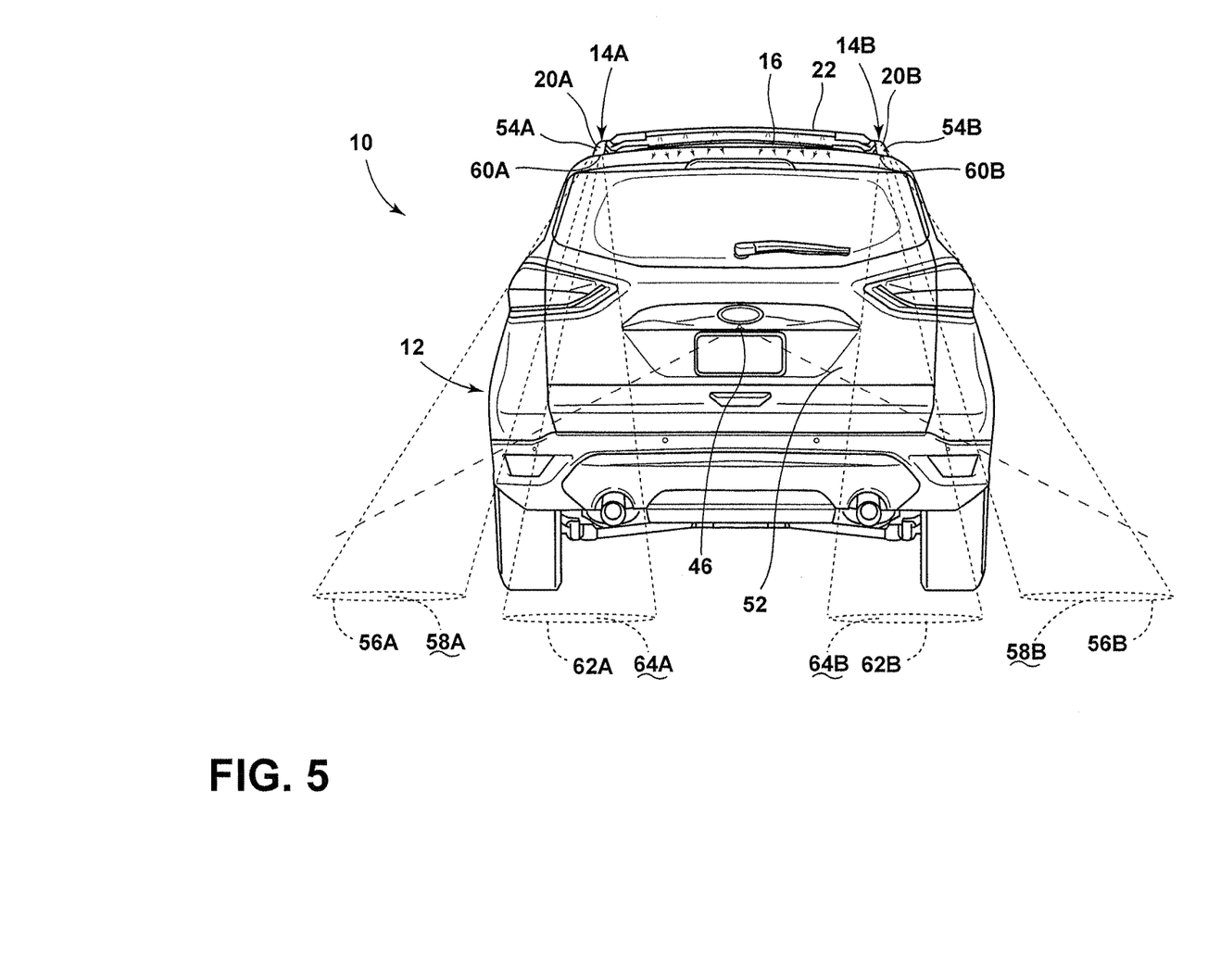
FIG. 5 is a rear view of the vehicle shown in FIG. 1.

Referring to FIGS. 1-5, a roof rack assembly 10 of a vehicle 12 is shown according to one embodiment. For purposes of illustration the vehicle 12 is exemplarily shown as a sports utility vehicle (SUV) but may include other vehicular types commonly equipped with roof racks such as, but not limited to, sedans, coupes, pickup trucks, station wagons, vans, and the like. As shown, the roof rack assembly 10 includes a pair of arched support racks 14A, 14B that are similar in construction and extend longitudinally across a roof structure 16 of the vehicle 12. The support racks 14A, 14B are each conventionally mounted to an outer edge portion of the roof structure 16 at a corresponding front end 18A, 18B and a corresponding rear end 20A, 20B. A number of crossbars 22 that are similar in construction extend laterally across the roof structure 16 and are coupled to each of the support racks 14A, 14B. The crossbars 22 may be arched or substantially straight in construction and mounted to the support racks 14A, 14B at an elevated position relative to the roof structure 16. While two crossbars 22 have been exemplarily illustrated, it should be apparent to those skilled in the art that the roof rack assembly 10 described herein may include more or less crossbars 22 if desired.

In the depicted embodiment, each of the support racks 14A, 14B include a corresponding light source 24A, 24B provided at their front end 18A, 18B and disposed to downwardly project a light beam 26A, 26B across a hood 28 of the vehicle 12. Light beams 26A and 26B may be collimated or spread-out to flood a substantial portion of the hood 28 and may be expressed in a variety of visible light colors. According to one embodiment, the light beams 26A and 26B are overlapping and may cooperate to project an icon or image (e.g., LOGO) across the hood 28. In one specific example, light sources 24A and 24B are concurrently activated during a vehicle welcoming event that may be initiated when a vehicle occupant (e.g., a driver) approaching the vehicle 12 remotely unlocks doors 30A-30D of the vehicle 12 using an electronic portable device such as a key FOB, a smartphone, and the like, as known in the art. In response, light sources 24A and 24B are activated to illuminate the hood 28 with the LOGO as a welcoming effect. In some embodiments, the LOGO may be associated with a branding of the vehicle 12. Light sources 24A and 24B may remain activated for a predetermined period of time or be subsequently deactivated when the driver enters the vehicle 12, starts the engine, etc. It is contemplated that light sources 24A and 24B may be similarly operated during a vehicle departure event and are activated to illuminate the hood 28 with the LOGO when the vehicle occupant turns off the engine, exits the vehicle 12, locks the doors 30A-30D, etc. Light sources 24A and 24B may remain activated for a predetermined period of time or be deactivated following a user-initiated action such as locking the doors 30A-30D, for example.

With continued reference to FIGS. 1-5, each of the support racks 14A, 14B may additionally or alternatively include a number of light sources, exemplarily shown as light sources 32A-32D provided at corresponding intermediate portions 34A-34D of their respective support racks 14A, 14B. Light sources 32A-32D are each disposed to downwardly project a light beam 36A-36D to illuminate a corresponding ground area 38A-38D proximate doors 30A-30D thereby functioning as puddle lamps or supplemental puddle lamps if the vehicle 12 is already equipped with the same. It is contemplated that the light beams 36A and 36B may be collimated or spread-out and may be expressed in a variety of visible colors and may be overlapping or non-overlapping if desired. The same is true with respect to light beams 36C and 36D. Accordingly, it should be apparent to those skilled in the art that light beams 36A-36D may be expressed in the same color or different colors in any combination. In one specific example, light sources 32A-32D are concurrently activated during a vehicle welcoming event that may be initiated when a vehicle occupant approaching the vehicle 12 remotely unlocks doors 30A-30D of the vehicle 12 using an electronic portable device such as a key FOB, a smartphone, and the like, as known in the art. In response, light sources 32A-32D are activated to illuminate ground areas 38A-38D for a predetermined period of time or are subsequently deactivated when the driver enters the vehicle 12, starts the engine, etc. It is contemplated that light sources 32A-32D may be similarly operated during a vehicle departure event and are activated to illuminate the ground areas 38A-38D when the vehicle occupant turns off the engine, exits the vehicle 12, locks the doors 30A-30D, etc. Light sources 32A-32D may remain activated for a predetermined period of time or be deactivated following a user-initiated action such as locking the doors 30A-30D, for example.

In the depicted embodiment, each of the support racks 14A, 14B may additionally or alternatively include a corresponding light source 40A, 40B provided at their front end 18A, 18B and disposed to downwardly project a light beam 42A, 42B that may be collimated or spread-out to illuminate a corresponding ground area 44A, 44B proximate a front left and front right corner of the vehicle 12 thereby functioning as cornering lamps that assist a driver of the vehicle 12 in navigating a forward left turn or a forward right turn, respectively. Light beams 42A and 42B may be expressed in a variety of visible colors and light source 40A may be activated when a driver of the vehicle 12 initiates a forward left turn whereas light source 40B may be activated when the driver initiates a forward right turn. Alternatively, light sources 40A and 40B may be concurrently activated whenever a forward right or forward left turn is initiated by the drive of the vehicle 12. It is contemplated that the activation of light sources 40A and 40B may be conditioned on a travelling speed of the vehicle 12. For example, the light sources 40A, 40B may be activated singly, or in combination, if the travelling speed of the vehicle 12 is relatively low (e.g., less than 10 miles per hour) to assist a driver of the vehicle 12 in making forward cornering maneuvers in low speed environments such as a parking lot or residential road. Due to the inherent risk of potentially blinding other drivers, light sources 40A and 40B may be operably coupled to a front-vehicle camera 46 exemplarily provided at a rearview mirror assembly 48 and/or a rear-vehicle camera 50 mounted to rear body structure 52 of the vehicle 12. Activation of light sources 40A and 40B may be conditioned upon the cameras 46, 50, singly or in combination, detecting the presence, or lack thereof, of other vehicles in the operating environment of the vehicle 12 thereby enhancing the effective use of light sources 40A and 40B in both low speed and high speed operating environments.

Additionally or alternatively, each of the support racks 14A, 14B may include a corresponding light sources 54A, 54B provided at their rear end 20A, 20B and disposed to downwardly project a light beam 56A, 56B that may be collimated or spread-out to illuminate a corresponding ground area 58A, 58B proximate a rear left and rear right corner of the vehicle 12 thereby functioning as cornering lamps that assist a driver of the vehicle 12 in navigating a backward left turn or a backward right turn, respectively. In operation, it is contemplated that light sources 54A and 54B may behave similarly to light sources 40A and 40B and are generally activated during a reversal maneuver of the vehicle 12 in either a left turn or right turn direction and the activation of light sources 40a and 40B may be conditioned upon a travelling speed of the vehicle 12. It is further contemplated that light sources 40A and 40B and light sources 54A and 54B may be activated concurrently or in any combination pursuant to any of the embodiments described herein.

Additionally or alternatively, each of the support racks 14A, 14B may include corresponding light sources 60A and 60B provided at their rear end 20A, 20B and disposed to downwardly project a light beam 62A, 62B that may be collimated or spread-out to illuminate a corresponding ground area 64A, 64B behind the rear body structure 52 of the vehicle 12 thereby functioning as a rear-vehicle lamp. Light beams 62A and 62B may be expressed in a variety of visible colors and may be overlapping or non-overlapping if desired. In one specific example, light sources 60A and 60B may be concurrently activated when a driver of the vehicle 12 initiates a reversing maneuver. It is also contemplated that light sources 60A and 60B may be operably coupled to rear-vehicle camera 50 to provide supplemental illumination in dark environments alongside other rear-vehicle lights such as tail lamps, center rear high mount lamps, and the like.

Accordingly, the roof rack assembly 10 may include light sources 40A, 40B, 32A-D, 54A, 54B, 60A, and 60B, in any combination, all of which are generally disposed to project light downwardly and in a vehicle-outward direction. In some embodiments, each of the support racks 14A, 14B may additionally or alternatively include a number light sources 66 that project light downwardly and in a vehicle-inward direction to illuminate a substantial portion or the entirety of the roof structure 16. The light sources 66 may vary in location and are exemplarily shown spaced longitudinally across their respective support racks 14A, 14B and disposed between each of the crossbars 22. In alternative embodiments, the light sources 66 may be disposed to project light into the crossbars 22, which may be configured as light guides that produce 360 degree lighting, some of which serving to illuminate the roof structure 16. Additionally or alternatively, each of the crossbars 22 may include light sources (not shown) disposed therein for illuminating the same. In one specific example, the light sources 66 may be activated in conjunction with vehicle hazard lights, turn lights, and the like to enhance the visibility of the vehicle 12 pursuant to an intended action of the driver.

It should be apparent to those skilled in the art that the light sources described herein may be variously mounted in the support racks 14A, 14B and/or crossbars 22 to project light from an internal or external position. In one specific example, each of the light sources may be heat sunk to the support racks 14A, 14B and/or crossbars 22 and may include one or more light-emitting diodes to produce the corresponding light beams. Moreover, in instances where the light sources are disposed inside the support racks 14, 14B and crossbars 22, the support racks 14A, 14B and/or crossbars may be constructed from light-transmissive materials and may include optical elements for directing light emitted by each of the light sources in the directions described herein. Furthermore, the support racks 14A, 14B and/or crossbars 22 may be partial vacuum metalized to impart a metallic appearance thereto. It should be apparent to those skilled in the art that the support racks 14A, 14B and crossbars 22 described herein may take on various shapes and dimensions. However, it is generally desirable for the support racks 14A, 14B to have a height relative the roof structure 16 that does not prevent the roof structure 16 from obstructing the light output of the light sources. Similarly, the same considerations should be made regarding the location of the light sources within the support racks 14A, 14B and/or the crossbars 22.

Accordingly, a roof rack assembly 10 of a vehicle 12 has been advantageously described. The roof rack assembly 10 may include a number of light sources to provide a wide variety of directional lighting based on a number of scenarios, some of which have been exemplarily described herein. However, those skilled in the art will undoubtedly recognize other lighting applications that stand to benefit from the use of the roof rack assembly 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A roof rack assembly comprising:
   a plurality of support racks provided on a roof structure of a vehicle;
   a first light source coupled to each support rack and configured to project an image across a hood of the vehicle during a welcome or departure event; and
   a second light source coupled to each support rack and configured to project a light beam to illuminate a corresponding ground area proximate a corner of the vehicle.

2. The roof rack assembly of claim 1, wherein the first light source is provided at a front end of each of the support racks.

3. The roof rack assembly of claim 1, wherein the second light source is provided at at least one of a front end and a rear end of each of the support racks.

4. The roof rack assembly of claim 1, wherein the second light source is activated when a driver of the vehicle performs one of a forward turn and a backward turn.

5. The roof rack assembly of claim 4, wherein activation of the second light source is conditioned upon a travelling speed of the vehicle.

6. The roof rack assembly of claim 1, further comprising a number of crossbars coupled to each of the support racks, wherein the crossbars are illuminated by additional light sources each coupled to one of the support racks and disposed at intermediate portions of the respective support racks.

7. The roof rack assembly of claim 1, further comprising a third light source coupled to each support rack and configured to project a light beam to illuminate a corresponding ground area behind a rear body structure of the vehicle.

8. A roof rack assembly comprising:
   a plurality of support racks provided on a roof structure of a vehicle;
   a first light source coupled to each support rack and configured to project an image across a hood of the vehicle during a welcome or departure event; and
   a second light source coupled to each support rack and configured to project a light beam to illuminate a corresponding ground area proximate a door of the vehicle.

9. The roof rack assembly of claim 8, wherein the first light source is provided at a front end of each of the support racks, and wherein the second light source is provided at an intermediate portion of each of the support racks.

10. The roof rack assembly of claim 8, wherein the second light source is activated during the welcome or departure event.

11. The roof rack assembly of claim 8, further comprising a number of crossbars coupled to each of the support racks, wherein the crossbars are illuminated by additional light sources each coupled to one of the support racks and disposed at intermediate portions of the respective support racks.

12. The roof rack assembly of claim 8, further comprising a third light source coupled to each support rack and configured to project a light beam to illuminate a corresponding ground area behind a rear body structure of the vehicle.

13. A roof rack assembly comprising:
   a plurality of support racks provided on a roof structure of a vehicle;
   a first light source coupled to each support rack and configured to project an image across a hood of the vehicle;
   a second light source coupled to each support rack and configured to project a light beam to illuminate a corresponding ground area proximate a corner of the vehicle; and
   a third light source coupled to each support rack and configured to project a light beam to illuminate a corresponding ground area proximate a door of the vehicle, wherein the first and third light sources are activated during a welcome or departure event.

14. The roof rack assembly of claim 13, wherein the first light source is provided at a front end of each of the support racks, wherein the second light source is provided at at least one of a front end and a rear end of each of the support racks, and wherein the third light source is provided at an intermediate portion of each of the support racks.

15. The roof rack assembly of claim 13, wherein the second light source is activated when a driver of the vehicle performs one of a forward turn and a backward turn.

16. The roof rack assembly of claim 15, wherein activation of the second light source is conditioned upon a travelling speed of the vehicle.

17. The roof rack assembly of claim 13, further comprising a number of crossbars coupled to each of the support racks, wherein the crossbars are illuminated by additional light sources each coupled to one of the support racks and disposed at intermediate portions of the respective support racks, and further comprising a fourth light source coupled to each support rack and configured to project a light beam to illuminate a corresponding ground area behind a rear body structure of the vehicle.

* * * * *